N. DuBRUL.
SAFETY-VALVE.
No. 190,711.
2 Sheets—Sheet 1.
Patented May 15, 1877.
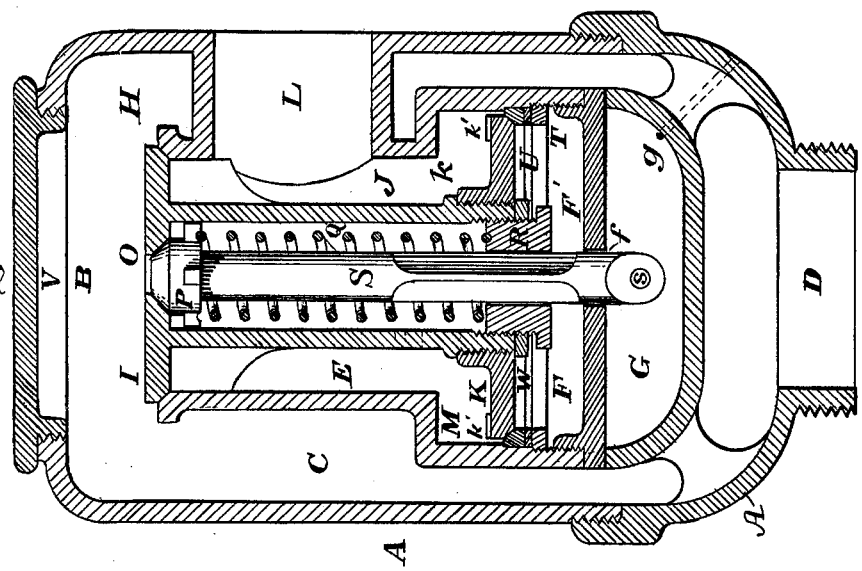
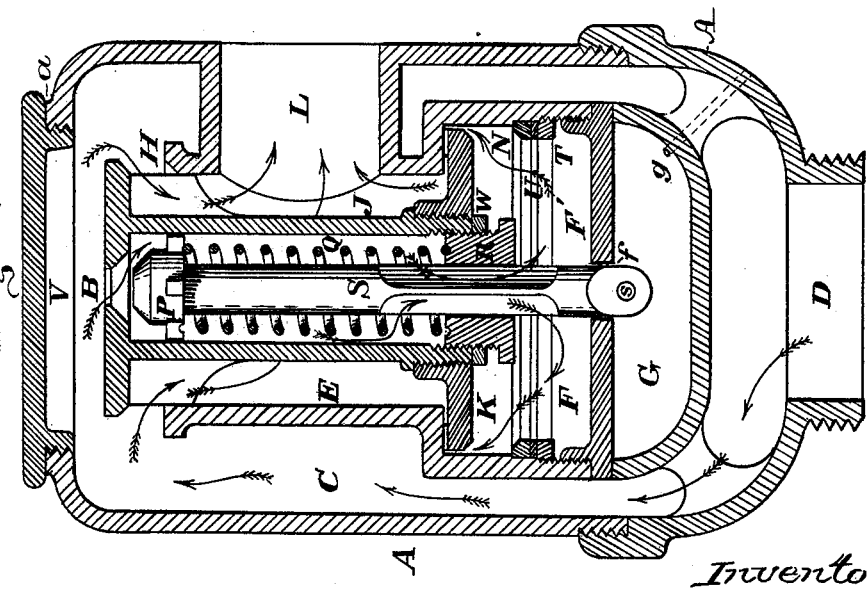
Attest.
Walter Knight
Harry Knight
Inventor:
N. DuBrul
by Knight Bros
attys.

N. DuBRUL.
SAFETY-VALVE.

No. 190,711. Patented May 15, 1877.

Attest.
Walter Knight.
E. S. Fleming.

Inventor
N. DuBrul
By Knight Bros.
Attys

UNITED STATES PATENT OFFICE.

NAPOLEON DU BRUL, OF CINCINNATI, OHIO.

IMPROVEMENT IN SAFETY-VALVES.

Specification forming part of Letters Patent No. 190,711, dated May 15, 1877; application filed March 6, 1877.

*To all whom it may concern:*

Be it known that I, NAPOLEON DU BRUL, of Cincinnati, Hamilton county, Ohio, have invented a new and useful Improvement in Safety-Valves, of which the following is a specification:

This is an improvement in those safety-valves in which a valve proper of ample capacity is opened through the instrumentality of an auxiliary valve of much smaller area, so as to combine extreme sensitiveness with effective relief.

My invention consists in combining with a valve-chamber a concentric shell, forming a steam-jacket between two concentric shells.

My invention consists, further, in combining with said valve-chamber and concentric shell a valve proper, composed of two disks of unequal areas, the smaller disk being held shut by the fluid.

Figure 3:
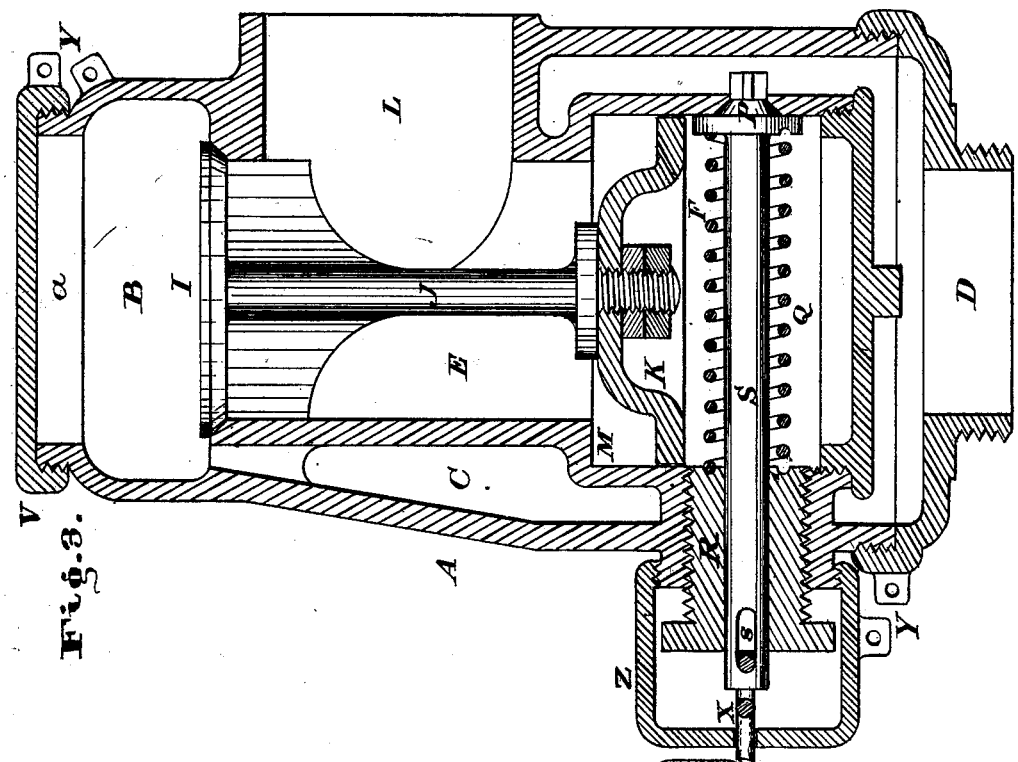
Figure 4:
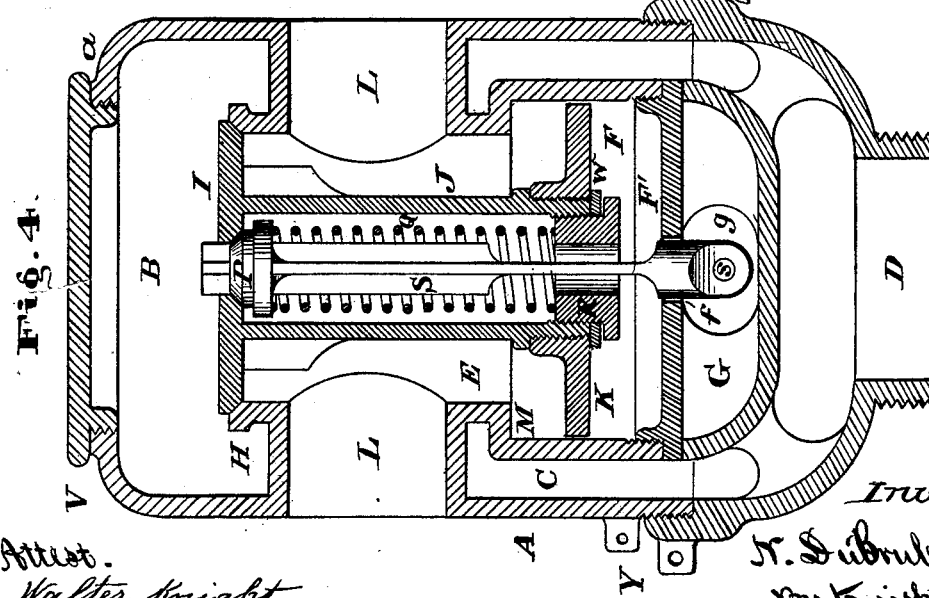

In the accompanying drawings, Figure 1 is an axial section of my preferred form of safety-valve in its closed condition. Fig. 2 is a similar section of the same valve, in the open condition. Figs. 3 and 4 represent, by axial sections, two modifications of my invention.

A may represent any suitable confining shell or casing. A chamber, B, in the upper part of the shell A communicates, by annular passage C, with screw-neck D, by which the valve is attached to and communicates with the steam-boiler or other reservoir of fluid under pressure.

The inner wall of the annular passage C constitutes the outer wall of a series of chambers, E, F, and G. Of these chambers the chamber E is surmounted by an opening, H, which forms the seat for the smaller disk I of a compound or double-headed valve, I J K, which constitutes my valve proper. The head or disk I, opening against the fluid-pressure, is held, by the latter, tightly shut in the normal condition of the valve. The chamber E has one or more exhaust openings or ports, L.

The chamber E is enlarged at its lower portion for the larger disk K of the valve proper, so as to leave a shoulder or stop, M, which limits the ascent of said valve proper. The chamber E terminates below in a seated opening, N, of the larger disk of my valve proper I J K.

The space below my valve proper, which space I call the "chamber" F, communicates with the fluid-pressure chamber B, through the hollow stem J of my valve proper, whenever the pressure exceeds the prescribed maximum. With this object in view the upper extremity of said hollow stem is an inverted seat, O, for a small valve, P, which opens with the fluid-pressure whenever that pressure exceeds the prescribed maximum. The valve P is held firmly closed against any lesser fluid-pressure by a helical spring, Q, whose stress is maintained and regulated by a gland or plug, R, screwed into the lower end of the hollow stem J. Through orifices in the plug R and in the floor of the chamber F the stem S of my auxiliary valve P protrudes into the chamber G. The chamber G has no communication with the interior spaces of the safety-valve. It may, however, communicate by opening $g$ with the atmosphere. An orifice, $s$, in stem S may enable the application of a rod or lever from the outside, by which to open the auxiliary valve at discretion of the attendant, and by so doing to open the valve proper and blow off steam or other confined fluid. The opening $g$ is also useful as an outlet for water of condensation escaping through opening $f$ in chamber F.

The seat N of the larger disk K of valve proper I J K is a loose ring, held to its proper place by nut or screw-threaded annulus T, tapped within the screw-threaded walls of the chamber F.

A gasket, U, of india-rubber or other elastic material, is interposed between the annulus T and seat N.

The floor F' of chamber F and the lower portion A' of shell A are, respectively, screwed to their places in the manner shown.

The shell A is surmounted by an axial opening, $a$, closed by a screw-cap, V.

The plug R, having been set to its proper place, is secured against displacement by a jam-nut, W.

The larger disk K of compound valve is secured to stem J by screw-thread attachment $k$.

The operation of my safety-valve is as follows:

The auxiliary valve P having been set to the proper pressure by adjustment of the helical spring Q through the instrumentality of the screw-plug R, and the seat N secured to its proper place by means of annulus T and gasket U, the portions F' and A' are screwed to their places, and the apparatus screwed to its proper orifice in the steam-drum or other reservoir of compressed fluid. So long as the fluid-pressure remains below that required to open the auxiliary valve P, the pressure of the fluid upon the disk I keeps the valve securely closed, and no escape occurs. This condition of parts is shown in Fig. 1. The instant, however, that the imprisoned fluid reaches a pressure sufficient to open the auxiliary valve P, steam rushes through hollow stem J into chamber F beneath the lower and larger end of the compound valve I J K, causing a preponderance of pressure upward, so as to open the said compound valve, as seen in Fig. 2, and permit the escape of steam from the chamber E direct, and also through the hollow stem J and chamber F, as shown by arrows in said figure.

The instant that the relief thus afforded, or by reason of the working off of the steam-pressure through the engine, or by radiation of heat, leakage, or other cause, reduces the fluid pressure below the prescribed maximum, the auxiliary valve P, closing, arrests the outflow, and enables the fluid-pressure to close the valve proper I J K, and to restore the apparatus to its normal or inactive condition.

In the operation of my valve proper I J K the shoulder M is useful as a stop or limit that prevents such an opening of said valve as would place it beyond the power of the fluid-pressure to close it, while the down-rushing currents through the seat H and hollow stem J serve as a cushion to prevent the violent impact of the lower disk K against said shoulder. Again, in closing, the imprisoned fluid in the chamber F serves to ease the valve proper down to its seats, and to prevent concussion and "water-ram."

The auxiliary valve may be relatively so small as to necessitate but a very light spring, resulting in a highly sensitive mechanism, capable of producing a large ventage and prompt relief, and this at the full capacity of the valve proper, no matter how high a maximum the auxiliary valve be set to.

Room is provided around the edges of disk K sufficient to permit the flow of imprisoned fluid therearound from chamber F into chamber E in the open condition of the valve proper, and with this object in view interstices are secured between said disk and the stop M by the provision of projections $k'$ on the upper margin of said disk, as seen in Figs. 1 and 2.

While describing, as above, the preferred form of my invention, I reserve the right to vary the details of the apparatus. For example, in place of an auxiliary-valve passage through my valve proper, the stem of the latter may be solid, as in Fig. 3, and the auxiliary valve may occupy the chamber F, and open direct into said chamber from the annular passage C, the regulating screw-plug R being tapped through the side of the shell, and protected by a cap, Z.

The opening $g$ of chamber G may be merely large enough to provide for the escape of water of condensation, so as to make it impossible to tamper with the valve. Thus closed, the relief apparatus will be wholly interior and automatic; or an external graduated spring or weight connected to a lever coupled to the auxiliary-valve stem may enable the engineer to ascertain or even to change its maximum pressure.

The seat for the lower disk of the valve proper may be omitted, and the upper face of said disk be made to fit the shoulder M steam-tight, as in Figs. 3 and 4.

The stem of auxiliary valve, where it traverses the floor F', should be larger than the effective outer area of so much of said valve as is exposed to the fluid-pressure when shut, while the annular passage around the larger disk K of the valve proper should be of somewhat less area than that of the auxiliary-valve opening.

The auxiliary-valve stem, being slotted, as at $s$ in Fig. 3, may receive a link, X, by which the valve may be opened at discretion of the attendant; but inasmuch as an inward pressure of the link would bear upon the gland only, and be wholly without effect on the valve, this provision will afford no opportunity for tampering with the point of maximum pressure to which it has been set.

Ears Y, projecting from the shell, may permit the parts of the valve to be securely locked together.

It is apparent that the represented position of the double-headed valve proper I J K, in which the smaller head or disk I is uppermost, causes the weight of the valve to co-operate with the (diminished) steam-pressure to close the valve, and supersedes the necessity of any special spring for that purpose.

I claim as new and of my invention—

1. The combination, with a valve-chamber, E, of the concentric shell A, forming a steam-jacket, C, as and for the purpose set forth.

2. The combination of double-headed valve I J K, chamber E, and concentric shell A, forming steam-jacket C, as and for the purpose set forth.

In testimony of which invention I hereunto set my hand.

NAPOLEON DU BRUL.

Attest:
 GEO. H. KNIGHT,
 WALTER KNIGHT.